3,247,054
INHIBITING THE GROWTH OF ALGAE IN WATER WITH AMINO-SUBSTITUTED HIGHER ALKANOL CONTAINING FROM ABOUT 8 TO 18 CARBON ATOMS
Edward B. Hodge, Terre Haute, Ind., assignor to Commercial Solvents Corporation, a corporation of Maryland
No Drawing. Filed Mar. 2, 1964, Ser. No. 348,765
6 Claims. (Cl. 167—22)

The present invention relates to the treatment of industrial waters such as are used in swimming pools and circulated through heat exchangers, cooling ponds, towers and like apparatus, and more particularly to the treatment thereof with a higher amino substituted alcohol capable of inhibiting the growth of algae and like organisms.

Industrial waters that have been passed through heat exchangers and like devices for absorbing the heats of chemical reactions, sensible heats, latent heats and the like such as those occurring in the practice of distillation, cracking, fractionation, etc., are usually cooled and recycled for reuse. Cooling is most efficiently accomplished in the well known cooling tower wherein the water flows downwardly over a series of baffles and is subjected to contact with the atmosphere or in spray devices wherein the water is sprayed into the air and collected in a surrounding pond.

A material problem in the operation of such towers and other cooling devices is the growth of algae and similar organisms. Algae are very small and simple forms of plant life which usually combine in large masses, generally as stringy weed-like formations. Such formations attach themselves to any solid object with which the algae-containing water comes into contact. Other types of algae float and form the scum often seen on still water. Under favorable conditions of light and temperature, algae develop a very disagreeable odor and unpleasant, fishy taste. The latter developments occur especially with the type of algae known as blue-green algae. Other organisms such as slime bacteria surround themselves with gelatinous secretion, actually forming slimy masses which are quite undesirable in cooling systems where, for example, they seriously interfere with the flow of water.

Such algae constitute a major problem in the handling of industrial waters in that they tend to coat any surface they contact and tend to block pipes and passages. The coating of such pipes is a most important disadvantage in association with refrigerating systems since the coating forms an insulation over the heat transfer surfaces and prevents maximum heat exchange.

Heretofore several methods of removing the algae have been attempted including mechanical cleaning and/or separation; however, mechanical cleaning is not always feasible because of the many small and relatively inaccessible pipes involved as in a heat exchanger and the necessity for shutting down the heating equipment for the process. Removal of the algae from water by mechanical separation, e.g., filtration, has also proved unsuccessful since the filters quickly become clogged, thus increasing filtration costs, and additionally, it is always necessary to aerate the water very thoroughly. Other proposals such as keeping light away from the water, maintaining high velocity turbulent flows, the periodic circulation of relatively hot water, and the use of electrical currents have also been generally unsuccessful. Chemical treatments as with copper salts, for instance, have been proposed but thus far have not been entirely satisfactory because of the corrosive effect of the chemicals on the metal apparatus, toxicity, and danger in handling. Like problems have been encountered in the treatment of swimming pool waters, etc.

It has now been surprisingly discovered that the growth or the development of algae in water systems, reservoirs and the like can be inhibited by the prsence of higher amino-substituted alcohols, having from about 8 to 18 carbon atoms. Other suitable amino-substituted alkanols include aminododecanol, aminotetradecanol and amino tridecanol. Where a heavy growth of algae has already developed, it can be inhibited by the addition of suitable amounts of these higher amino-substituted alcohols. After a heavy growth has been inhibited, a much lower concentration can be used to prevent reinfestation, or to prevent infestation and growth of the undesired organisms in a newly installed system. The higher amino-substituted alcohols of the present invention can also be used to prevent the formation of slime deposits by inhibiting slime bacteria.

The higher amino-substituted alcohols of the present invention may be produced, for example, by the reduction of the reaction product of higher aldehydes and a nitroalkane. The higher amino-substituted alcohol used in algaestatic amounts in a particular aqueous system, e.g., industrial water or coolant system, will depend upon a number of different factors such as the degree of contamination by the algae, the rate of circulation of the liquid, the character of the apparatus through which the liquid is circulated, the character of the liquid, the temperature extreme to which it is subjected, and the material from which the cooling pond walls may be formed. In the case of old liquids, a high initial charge followed by reduced charges at intervals may be desirable. With fresh liquids, the heavy initial charge may be omitted. For algae inhibition in general, concentrations of the amino-substituted alcohol of from about 1 to 10,000 p.p.m. are generally used, although 10 to 500 p.p.m. is preferred as a satisfactory inhibitory amount in most cases.

Since different species of algae may be encountered, some of which are more affected by the different amino-substituted alcohols than other, it may be desirable in some cases to charge the water with a mixture of amino-substituted alcohols in accordance with the character of the algae content. In all cases, it is desirable that the character and amount of the amino-substituted alcohol be so selected that the corrosion of the associated apparatus is held to a minimum.

The following examples serve to further illustrate the invention without, however, limiting the same.

*Example I*

1-amino-2-undecanol is used for algaecidal activity at various concentrations in stock cultures. Illustrative stock cultures are *Chlorella pyrenoidosa*, *Chlamydomonas reinhardi*, *Scenedesmus obliquus*, *Oscillatoria tenuis* and a mixture of these. In the screening for algaestatic activity, 1-amino-2-undecanol was found to be effective in controlling the growth of algae at 10 p.p.m.

*Examples II to V*

1-amino-2-undecanol; amino-dodecanol; amino-tridecanol and amino-tetradecanol are each used in a concentration of 100 p.p.m. to inhibit the growth of algae in industrial waters.

Other higher amino alkanols can also be used in similar amounts.

Obviously, many modifications and variations of the invention as above set forth may be made without departing from the scope of the invention.

It is claimed:
1. A process for inhibiting the growth of algae in water which comprises introducing into the water in contact therewith amino-substituted higher alkanol containing from about 8 to 18 carbon atoms in an amount effective to inhibit the growth of algae.

2. The process of claim 1 wherein said alkanol is introduced in a concentration of from about 1 p.p.m. to 10,000 p.p.m.

3. The process of claim 2 wherein the amino-substituted alcohol is 1-amino-2-undecanol.

4. A process according to claim 3 wherein said amount is about 10 to 500 p.p.m.

5. A process for inhibiting the growth of algae and slime in industrial water systems which comprises introducing into the system in contact therewith 1-amino-2-alkanol having a chain length of from 8 to 18 carbon atoms in an amount effective to inhibit said growth in the system.

6. A process for inhibiting the growth of algae and slime in industrial water systems, which comprises incorporating in contact therewith amino-substituted higher alcohol containing from about 8 to 18 carbon atoms into the water of the system in an amount effective to destroy and inhibit said growth in the system.

References Cited by the Examiner

UNITED STATES PATENTS

| | | | |
|---|---|---|---|
| 2,913,414 | 11/1959 | Hodge | 252—51.5 |
| 3,054,749 | 9/1962 | Bennett et al. | 252—8.55 |
| 3,098,097 | 7/1963 | Grob et al. | 260—584 |
| 3,164,636 | 1/1965 | Druey et al. | 260—584 |

LEWIS GOTTS, *Primary Examiner*.